United States Patent [19]

Chadwick

[11] 3,710,868
[45] Jan. 16, 1973

[54] AIRCRAFT SUSPENDED BUCKET FOR FIRE FIGHTING

[75] Inventor: Russell D. Chadwick, Beaverton, Oreg.

[73] Assignee: Chadwick, Incorporated, Beaverton, Oreg.

[22] Filed: Jan. 27, 1971

[21] Appl. No.: 110,101

[52] U.S. Cl..................169/2 A, 222/504, 239/171
[51] Int. Cl................................................A62c 3/00
[58] Field of Search.........169/2 R, 2 A, 34; 222/504, 222/506, 508; 220/24 A; 73/421, 215, 216; 141/110; 244/136

[56] References Cited

UNITED STATES PATENTS

| 3,248,074 | 4/1966 | Cannon | 169/2 A |
|---|---|---|---|
| 3,556,469 | 1/1971 | Barger | 222/504 X |
| 3,129,849 | 4/1964 | Cochran | 222/504 X |
| 786,957 | 4/1905 | Crane | 220/24 A |
| 2,569,085 | 9/1951 | Wood et al. | 222/504 X |
| 2,652,175 | 9/1953 | Davis | 222/504 X |
| 3,053,420 | 9/1962 | De Saint-Martin | 222/504 X |
| 3,485,302 | 12/1969 | Thorpe | 169/2 R |
| 3,519,080 | 7/1970 | Rochat | 169/2 R |
| 3,572,441 | 3/1971 | Nodegi | 169/2 A |

Primary Examiner—Lloyd L. King
Attorney—Buckhorn, Blore, Klarquist & Sparkman

[57] ABSTRACT

A bucket, for suspension from the cargo hook of a helicopter, is provided with a plurality of valves and valve actuating means presenting a low profile and compact construction. The valve actuating means depend from arms extending inwardly from the bucket sides.

9 Claims, 8 Drawing Figures

PATENTED JAN 16 1973
3,710,868
SHEET 1 OF 2
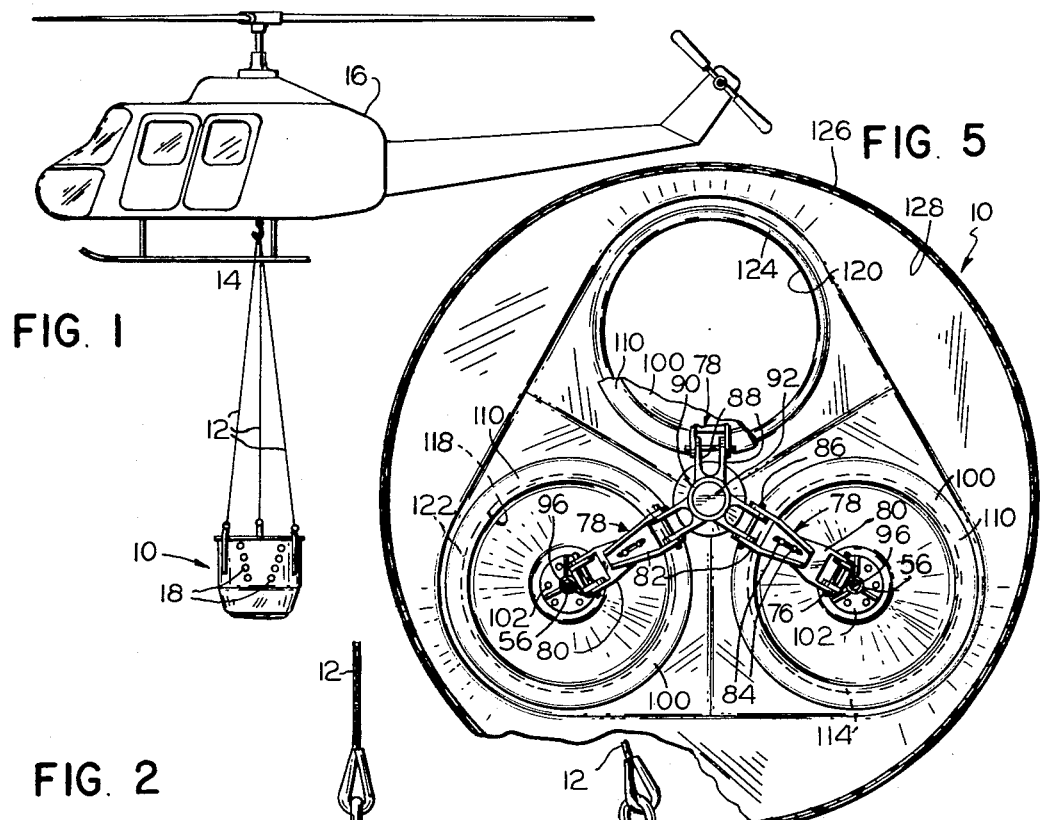
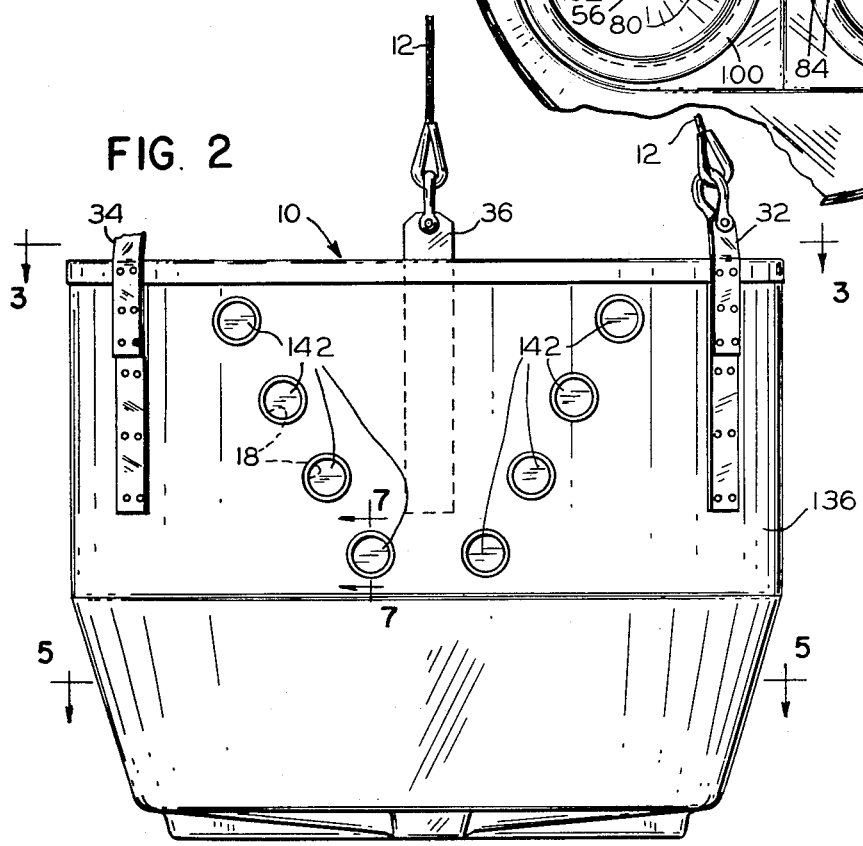
RUSSELL D. CHADWICK
INVENTOR
BY
BUCKHORN, BLORE, KLARQUIST & SPARKMAN
ATTORNEYS

RUSSELL D. CHADWICK
INVENTOR

BY
BUCKHORN, BLORE, KLARQUIST & SPARKMAN
ATTORNEYS

AIRCRAFT SUSPENDED BUCKET FOR FIRE FIGHTING

BACKGROUND OF THE INVENTION

One of the advances in control of forest fires is the use of the helicopter for hovering above the fire while dispensing a fire extinguishing substance therefrom. The helicopter is also able to travel fairly rapidly to and from the scene of a fire. Therefore, the helicopter can deliver fairly sizable quantities of water to the scene of a fire from a nearby lake or other body of water. For this purpose, a large container or bucket may be suspended beneath the helicopter from its cargo hook, with the quantity of water corresponding to the load-carrying capabilities of the helicopter.

It has been the practice heretofore to employ valves in the bottom of the fire fighting bucket or container which are operated by actuator means located centrally in a dome or the like centrally superimposed above the top surface of the bucket. This structure has been found to have several disadvantages. The upper dome containing the operating mechanism is apt to become fouled with the sling cables by which the bucket is normally suspended in flight. The cables become slack when the bucket is lowered into a body of water, or, of course, when the cables are being attached to the helicopter in the first place. Then, the cables are normally pulled taut as the helicopter rises, after which the bucket is raised from the ground or from a body of water. It has been found that the cables in the slack condition are apt to catch under the forementioned dome or actuator structure, and when pulled taut may damage or destroy this structure. Furthermore, the central actuator structure has necessitated a one-step assembly of the entire bucket mechanism after formation of the bucket shell. As a consequence, production has been slow and expensive. Also, the high structure of the bucket often prevents entry of the bucket into a desirable storage area, or into a helicopter or airplane through a door thereof for long distance transport or the like.

SUMMARY OF THE INVENTION

According to a feature of the present invention, a fire fighting bucket comprises an open-topped container adapted for suspension beneath an aircraft, said container having a plurality of outlet valves selectively operable for discharging the contents of the container. A plurality of arms extend inwardly from the sides of the container from which separate valve actuators and separate substantially waterproof housings therefor depend. Each of the actuators drives a respective actuator arm for operating one of the valves.

According to another feature of the invention, the bucket is provided with a double walled bottom construction, increasing the strength of the bucket and integrally providing part of the valve structure. The double walled bottom may be initially manufactured separately.

In accordance with another feature of the present invention, the bucket is provided with a plurality of side openings which may be selectively closed or opened to determine a given water level within the bucket. An opening is provided with a flexible plastic plug having an outer flange adapted to contact the outside of the container and including a cylindrical flexible portion which extends within the bucket container. The plug is also provided with an expansion ring for reception within the cylindrical portion of the plug for holding the plug in place, this ring having means for contracting the same for withdrawal from the plug, thereby allowing removal of the plug.

It is accordingly an object of the present invention to provide an improved aircraft suspended bucket for fire fighting which is economical in construction and durable in operation.

It is another object of the present invention to provide an improved aircraft suspended bucket for fire fighting which is less apt to damage in operation than previous buckets.

It is a further object of the present invention to provide an improved aircraft suspended bucket for fire fighting which is more compact and has a lower profile than previous buckets.

It is another object of the present invention to provide an improved plug for an aircraft suspended bucket for fire fighting, which plug is less apt to become dislodged or lost than plugs employed heretofore.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a helicopter carrying an aircraft suspended bucket according to the present invention for fire fighting;

FIG. 2 is a side elevational view of such bucket;

FIG. 5 is a cross-sectional view of the bottom portion of the bucket taken at 5—5 in FIG. 2;

DETAILED DESCRIPTION

Figure 4:
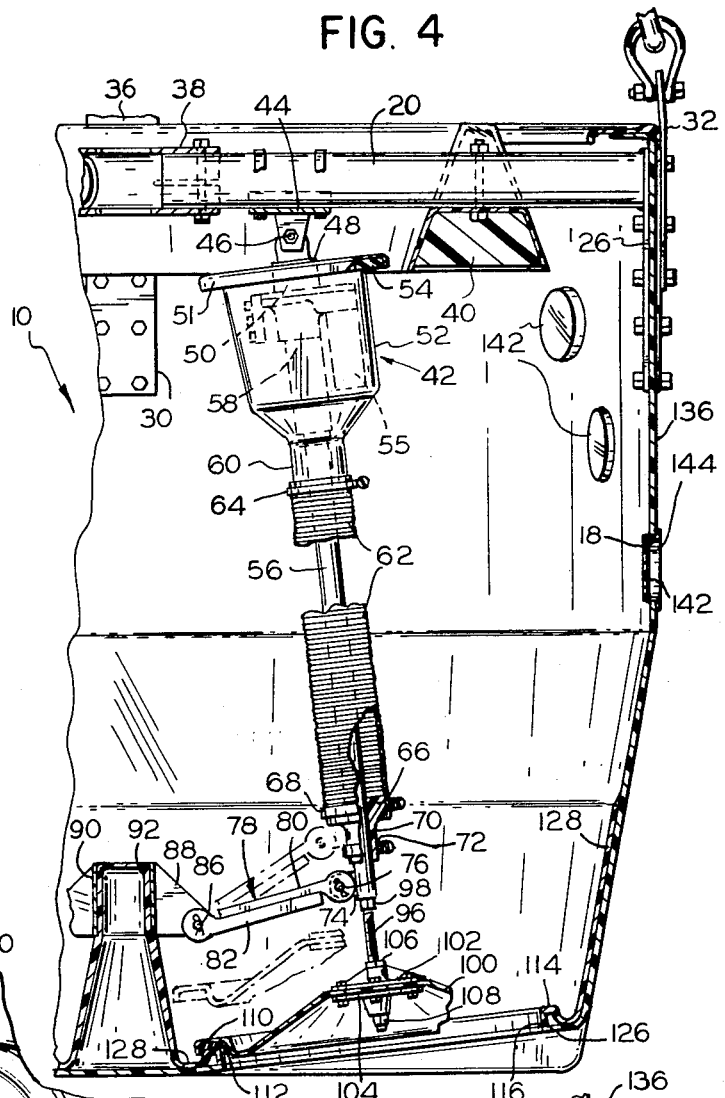
FIG. 4 is a sectional view, partially broken away, taken at 4—4 in FIG. 3.

Referring to the drawings, and particularly to FIG. 1, a fire fighting bucket 10 according to the present invention is illustrated as suspended by a three-cable sling 12 from the cargo hook 14 of a helicopter 16. The bucket 10 comprises an open topped fiberglass shell which is otherwise closed except for a plurality of dumping valves located in the bottom of the bucket (see FIG. 5) and a plurality of circular side openings 18. In the normal situation, wherein the entire bucket is utilized, openings 18 will be closed by means of plastic plugs as hereinafter more fully described. In general operation of the fire fighting apparatus, the helicopter lowers the bucket into a body of water such as a lake, with the bucket having sufficient weight so that it substantially completely submerges for top filling thereof as the helicopter hovers thereabove. The helicopter then raises the bucket and flies to a desired position over a forest fire or the like. The bottom valves of the bucket are then operated electrically from within the helicopter, and the contents of the bucket are discharged. In a particular example according to the present invention, the bucket carries approximately 4,000 pounds of water.

Now referring more particularly to FIGS. 2 through 5 illustrating the bucket in greater detail, a plurality of metal spreader arms 20, 22, and 24 are secured to the fiberglass shell comprising the outside wall of the bucket by means of end flanges 26, 28, and 30. Bolts, extending through the fiberglass wall, secure these flanges to outer plates 32, 34, and 36 to which the cable sling may be secured. The arms extend substantially straight inwardly proximate the top level or lip of the bucket, or just below the same, and are joined by means of a central spreader 38 completing a rigid structure. A flotation ring 40 may be secured to the underside of the arms 20, 22, and 24, for adding buoyancy to the structure. This flotation ring may comprise a fiberglass outer or upper shell which is foam filled. The floatation ring adapts the bucket to float just below the surface of the water, permitting filling of the same without complete loss of the bucket by sinking should the sling become disengaged from the helicopter, for example.

The bucket is provided with three lower valves for releasing the water from the bucket, and is provided with three separate actuators therefor. For example, an actuator 42 depends from arm 20 to which it is secured by clamping means 44. Clamping means 44 has a pivotal connection 46 to a plate 48 bolted to actuator body 50 on the inside of actuator housing lid 51. The actuator housing lid 51 is sealed to actuator housing 52 by means of a rubber seal 54 therebetween for providing a water-tight connection. Both the actuator housing 52 and lid 51 are suitably formed of fiberglass.

The actuator further comprises a motor 55 depending from actuator body 50 for driving actuator rod 56 extending from the lower tubular portion 58 of the actuator. The actuator operates as a gearmotor for raising and lowering actuator arm or rod 56 according to the direction of rotation of motor 55. Gearmotors and the like of this type are well known in the art and will not be described in detail. The actuator arm 56 is extended downwardly through a lower opening in actuator housing 52 where the actuator housing concludes in a narrowed neck 60.

Below the housing neck 60, actuator rod 56 is surrounded by a flexible hose seal 62 which is accordioned and formed of waterproof material. This hose seal is clamped to neck 60 by means of a clamp 64 at the upper end of the hose seal, and is clamped to a plastic sealing member 66 at its lower end by means of a clamp 68. The plastic sealing member 66 is somewhat compressible and circular for receiving the hose seal and clamp 68 at its larger diameter, and also includes a smaller diameter extension 70 which is closely clamped to actuator rod 56 by means of a clamp 72. As the actuator rod moves up and down, the seal accordions and maintains the actuator housing waterproof.

An extension 74 is secured to the lower end of rod 56 for receiving a pin 76 of a pivotable linkage generally indicated by the reference numeral 78. A first forked member 80 pivots on pin 76 and is extendably secured to a second forked member 82 by means of bolts 84. The second forked member receives a pin 86 also passing through bearing arms 88 of a central ring 90 which is secured to a fiberglass post 92 extending upwardly from the bottom of the fiberglass container. The purpose of the linkage 78 is for guiding the movement of rod 56 so as to guide the same and insure the valve disc attached thereto will seat properly.

At its lower end, rod 56 threadably receives threaded adjusting rod 96. Adjusting rod 96 is held in a given position by means of jam nut 98 which is ordinarily tightened against the lower end of rod 56. This jam nut may be loosened for adjustment and the like as hereinafter more fully described. At its lower end, threaded adjusting rod 96 is jointed to the disc 100 of one of the lower valves of the bucket. The disc 100 is suitably formed of fiberglass and is joined to rod 96 by means of upper and lower plate members 102 and 104 which bolt through apertures in disc 100. Rod 96 passes through an extension of plate 102 to a point on the underside of disc 100, and locknuts 106 and 108 are employed to secure the disc 100 at the proper level.

The disc 100 is bell-shaped, but flattens to an outer periphery including a upraised edge 110 providing a cup underneath in which a circular neoprene seal 112 is secured. This seal makes sealing contact with valve seat 114 in FIG. 5.

Referring to FIG. 5, illustrating the bottom portion of the fiberglass container comprising the bucket, the same is provided with opening ports 116, 118, and 120, the upper edges of which provide valve seats 114, 122, and 124, for respective valves. The openings are arranged triangularly, and also the bottom of the container is somewhat narrowed and triangularly shaped. From the center of this fiberglass structure, the aforementioned post 92 extends upwardly between the openings.

The bottom of the container is double walled comprising layers 126 and 128, for providing added strength, with the outer configuration adapting the container to rest upon the ground when not in use. The upper wall 128 is upwardly formed to provide the valve seats such as seat 114, as well as the post 92. The valve seats are thereby formed in a unitary manner with the bottom of the container. The double wall bottom construction (e.g., as viewed in FIG. 5) is desirably formed separately and then joined peripherally to the upper part of the fiberglass container.

The fire fighting bucket according to the present invention is provided with two more actuator assemblies which are suitably substantially identical to the one described, and which depend respectively from the lower sides of arms 22 and 24, i.e. also substantially out of the way of the cable sling which is utilized to support the container. These actuator assemblies operate the respective valves provided.

Figure 6:
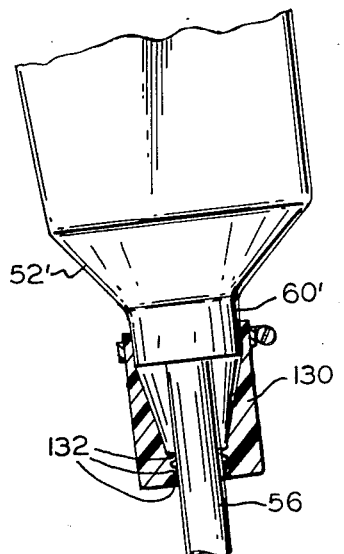
FIG. 6 is a detailed view of an alternative structure for sealing an actuator arm according to the present invention.
Figure 8:
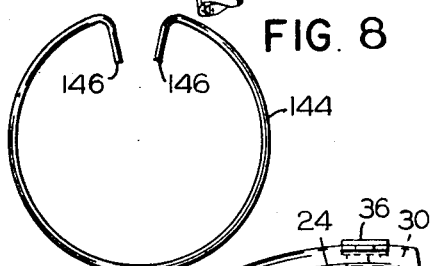
FIG. 8 is a front view of an expansion ring for holding the FIG. 7 plug in place.
Figure 3:
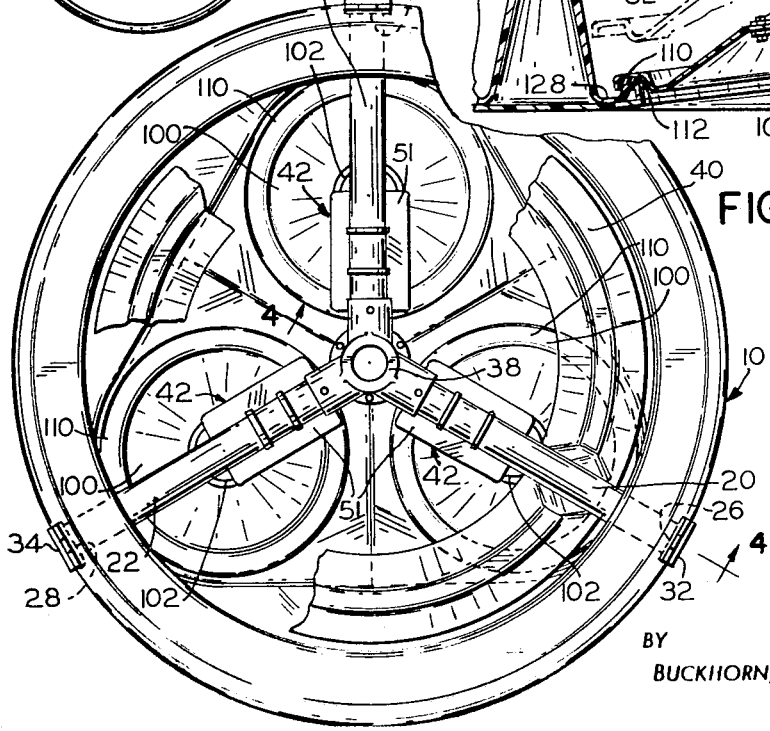
FIG. 3 is a plan view of the aforementioned bucket.

FIG. 6 illustrates an alternative construction for replacing the above-mentioned flexible hose seal 62 at the lower end of housing 52. In FIG. 6, the lower end of the housing 52' is provided with a rubber sealing member 130 adhered around the neck 60' thereof. At is lower end, member 130 is shaped to provide round lobes 132 which bear upon actuator rod 56 to provide sealing. In the case of either the sealing member 130, or the previously described flexible hose seal 62, the actuator structure is protected from the liquid in the bucket even though the actuator housing is oft-times submerged below the surface of liquid in the bucket.

In operation, the actuators, such as actuator 42, are operated remotely from within the helicopter so as to rotate a motor 55 in reverse directions. Limit switches may also be provided in a conventional manner to prevent overrun of the motor. The motor is employed for raising and lowering the actuator rod 56 which, of course, raises and lowers valve disc 100 against a valve seat 114. When the container is full, and the helicopter is hovering over a fire location, one or all of the actuators may be operated for opening their respective valve discs and allowing the outflow of water. The outflow itself, when it begins, aids in further raising the discs because of the narrowed triangular shape of the bottom of the container.

The threaded extension 96 may be adjusted both at its upper end, by means of lock nut 98, or its lower end by means of nuts 106 and 108, for adjusting the positioning of the disc 100. Also, in the event of malfunction of one of the valve actuators, the particular valve actuator may be disconnected from the threaded rod 96 and removed, or else the threaded rod 96 may be turned to lower the disc 100 for a given position of the actuator until the disc 100 is firmly seated against valve seat 114.

The overall construction of the fire fighting bucket according to the present invention is compact and provides a low profile, not only adapting the bucket for easier storage and easier entrance into and removal from the door of a helicopter, but also prevents the fouling of the sling cables on external or upwardly protruding structures which heretofore characterized aircraft-suspended fire fighting buckets. Furthermore, the present construction is easily adapted to sub-assembly before general assembly of the apparatus, and it is more adaptable to maintenance in the field or removal of parts for replacement or repair.

Figure 7:
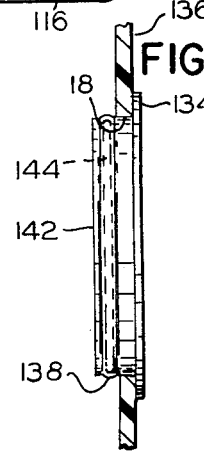
FIG. 7 is a cross-sectional view of a side plug in position in a bucket according to the present invention, the bucket being shown in cross section.

FIG. 7 illustrates in greater detail the plug structure which may be employed in the bucket according to the invention. The plug includes an outer flange 134 for placement against the outside of wall 136 of the container 10. A cylindrical part of the plug, 138, extends through an aperture 18 in the container wall and this cylindrical part ends in substantially flat closure 142. The plug is suitably formed of partially flexible plastic such as polyethylene or the like. A snap ring 144 is received within the cylindrical portion of the plug, and is adapted to expand outwardly for holding the plug in place despite the water pressure which may be present within the container. The snap ring is also provided with means for contracting the same for withdrawal from the plug, i.e. including inwardly directed extensions 146 on the end thereof which may be grasped between thumb and forefinger (or with a tool) when either inserting or withdrawing the ring from the plug. With the snap ring 144 removed from the plug, the plug may be inserted into or removed from aperture 18. This plug construction is an improvement upon the prior art plug construction which comprised only a plastic member which was inserted through an aperture from inside the container. This prior construction not only prevented easy removal and withdrawal of the plugs, but also subjected the plugs to accidental dislodgement from their apertures. Thus, although water pressure was relied upon to keep the plugs in place, if one of the plugs was accidentally struck from the outside, the same would become dislodged and substantially lost within the large container or within a body of water into which the container is introduced. The present plug is easily inserted, and furthermore will be removed only when desired.

The plugs are left in place for providing maximum water carrying capacity for the bucket. However, a helicopter with lesser load carrying capability, or one transporting appreciable fuel, may employ a bucket with plugs removed down to a desired filling level. Excess liquid will leave by the non-closed openings as the helicopter lifts the bucket from a lake or the like. Water will also enter through these openings as the helicopter lowers the bucket for filling, and the bucket may be lowered to only a given level.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Fire fighting apparatus comprising:
    an open topped container adapted for suspension beneath an aircraft permitting top filling of said container,
    said container having a plurality of outlet valves remotely and selectively operable for discharging the contents of said container when said aircraft is in flight,
    a plurality of arms extending inwardly from the sides of said container, said arms being joined together by a common central spreader means,
    a plurality of separate valve actuators and separate substantially waterproof housings therefor, each depending from one of said arms below the open top of said container in said container,
    and actuator arms extending substantially downwardly from each of said housings for connection to said valves and driven by the respective actuators for operating the respective valves.

2. The apparatus according to claim 1 including a pivotal connection between each said actuator and the housing therefor, and the inwardly extending arm from which it depends,
    said apparatus further including a pivotable link connecting each said actuator arm to a fixed point for guiding said actuator arm to guide the valve operated thereby into proper seated position.

3. The apparatus according to claim 1 wherein each of said actuator arms is further provided with a threaded adjusting rod interposed between said actuator arm and a said valve for positioning said valve.

4. The apparatus according to claim 1 wherein each of said valves comprises a valve seat surrounding an open port in the bottom of said container, each of said valves further comprising a disc having a seal therearound and connected to a said actuator arm for closure with said valve seat upon substantially downward movement of the said actuator arm.

5. The apparatus according to claim 1 further including a flexible hose seal between an opening in said housing for said actuator, through which said actuator arm extends, and a point on said actuator arm therebelow.

6. The apparatus according to claim 1 further including round, lobed sealing means at a lower opening of said actuator housing, through which said actuator arm extends, permitting slidable operation of said actuator arm therethrough.

7. The apparatus according to claim 1 wherein said container is provided with a plurality of circular openings at various levels on the side thereof for selectively reducing the amount of liquid which may be carried in said container, said apparatus further including a flexible plastic plug for a said opening, said plug having an outer radial flange adapted to contact the outside of said container and including a substantially cylindrical flexible portion adapted to extend inwardly through one of said openings into said container from the said flange, as well as an inward closure at the end of said substantially cylindrical portion, and further including an expansion ring for reception within the cylindrical portion of said plug within said container and adjacent said closure, said ring having means for contracting the same for withdrawal from said plug for allowing removal of said plug.

8. The apparatus according to claim 1 wherein said valves are located in the bottom of said container, the bottom of said container being double walled, with the upper wall thereof being upraised to provide valve seats for said valves, said valves also comprising discs for mating with said seats.

9. Fire fighting apparatus comprising:

an open topped container permitting top filling of said container adapted for suspension beneath an aircraft, said container having outlet valves selectively operable for discharging the contents of said container when said aircraft is in flight, at least one circular opening in the side of said container for selectively reducing the amount of liquid which may be carried in said container, a flexible plug for said opening, said plug having an outer radial flange adapted for positioning against the outside of said container and including a substantially cylindrical flexible portion adapted to extend inwardly through said opening into said container from the said flange, and an inward closure at the inward end of said substantially cylindrical portion, and further including an expansion ring for reception within the cylindrical portion of said plug within said container, said ring being adapted for contracting and removal from said plug so that said plug may be removed from said opening.

* * * * *